(12) United States Patent
Taivalsaari et al.

(10) Patent No.: US 11,231,920 B2
(45) Date of Patent: Jan. 25, 2022

(54) ELECTRONIC DEVICE MANAGEMENT

(71) Applicant: NOKIA TECHNOLOGIES OY, Espoo (FI)

(72) Inventors: Antero Taivalsaari, Tampere (FI); Teemu Ilmari Savolainen, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/041,526

(22) PCT Filed: Mar. 27, 2019

(86) PCT No.: PCT/EP2019/057713
§ 371 (c)(1),
(2) Date: Sep. 25, 2020

(87) PCT Pub. No.: WO2019/185709
PCT Pub. Date: Oct. 3, 2019

(65) Prior Publication Data
US 2021/0011710 A1    Jan. 14, 2021

(30) Foreign Application Priority Data
Mar. 28, 2018 (EP) ..................... 18164451

(51) Int. Cl.
*G06F 9/44* (2018.01)
*G06F 8/65* (2018.01)
*G06F 16/27* (2019.01)
*G06F 16/23* (2019.01)

(52) U.S. Cl.
CPC ............ *G06F 8/65* (2013.01); *G06F 16/2379* (2019.01); *G06F 16/27* (2019.01)

(58) Field of Classification Search
CPC ........................................................ G06F 9/44
See application file for complete search history.

(56) References Cited

U.S. PATENT DOCUMENTS

| | | | |
|---|---|---|---|
| 9,405,526 B2 | 8/2016 | Thapar et al. | |
| 2003/0177486 A1 | 9/2003 | Bakke et al. | |
| 2015/0208349 A1* | 7/2015 | Ramamurthy | H04W 52/028 370/311 |
| 2016/0261690 A1 | 9/2016 | Ford et al. | |
| 2017/0031671 A1 | 2/2017 | Joshi et al. | |

(Continued)

OTHER PUBLICATIONS

"Assets on the Bitcoin Blockchain with BitTorrent" [online] [Retrieved Oct. 13, 2020] Retrieved from the Internet: <URL: https://bravenewcoin.com/news/assets-on-the-bitcoin-blockchain-with-bittorrent/> (Aug. 3, 2015), 5 pages.

(Continued)

*Primary Examiner* — Jae U Jeon
(74) *Attorney, Agent, or Firm* — Alston & Bird LLP

(57) ABSTRACT

According to an example aspect, there is provided a method comprising: generating a smart contract with information of a number of targeted devices to perform an update, providing the smart contract for a distributed ledger for the number of targeted devices, receiving an indication to the distributed ledger on readiness to perform the update by the number of targeted devices, and receiving another indication to the distributed ledger on the performance of the update by the number of targeted devices.

19 Claims, 5 Drawing Sheets

(56) References Cited

U.S. PATENT DOCUMENTS

2017/0140408 A1* 5/2017 Wuehler ............ G06Q 30/0207
2017/0279774 A1* 9/2017 Booz .................... G06Q 20/123

OTHER PUBLICATIONS

Bitcoin—Wikipedia [online] [Retrieved Oct. 12, 2020] Retrieved from the Internet: <URL: https://en.wikipedia.org/w/index.php?title=Bitcoin&oldid=832694472>. (Mar. 27, 2018), 35 pages.

BitTorrent—Wikipedia [online] [Retrieved Oct. 12, 2020] Retrieved from the Internet: <URL: https://en.wikipedia.org/w/index.php?title=BitTorrent&oldid=832764142>. (Mar. 27, 2018), 24 pages.

Boudguiga et al., "Towards Better Availability and Accountability for IoT Updates by Means of a Blockchain", 2017 IEEE European Symposium on Security and Privacy Workshops, (Apr. 26, 2017), pp. 50-58.

Christidis et al., "Blockchains and Smart Contracts for the Internet of Things", IEEE Access, vol. 4, (May 10, 2016), pp. 2292-2303.

Ellul et al., "AlkylVM: A Virtual Machine for Smart Contract Blockchain Connected Internet of Things", 2018 9th IFIP International Conference on New Technologies, Mobility and Security (NTMS), IEEE (Feb. 26, 2018), 4 pages.

Extended European Search Report for Application No. 18164451.9 dated Jul. 26, 2018, 8 pages.

GitHub—elendirx/web2web: P2P Web Powered by Torrents and Blockchain [online] [Retrieved Oct. 12, 2020] Retrieved from the Internet: <URL: https://github.com/elendirx/web2web>. (Oct. 9, 2016), 3 pages.

International Search Report and Written Opinion for Application No. PCT/EP2019/057713 dated May 10, 2019, 11 pages.

Lee et al., "Blockchain-based Secure Firmware Update for Embedded Devices in an Internet of Things Environment", The Journal of Supercomputing 73 (2017), pp. 1152-1167.

A Firmware Update Architecture for Internet of Things Devices [online] [Retrieved Oct. 16, 2020] Retrieved from the Internet: <URL: https://tools.ietf.org/id/draft-moran-fud-architecture-00.html#rfc.section.3.6 (Jul. 18, 2017), 7 pages.

Network Function Virtualization—Wikipedia [online] [Retrieved Oct. 12, 2020] Retrieved from the Internet: <URL: https://en.wikipedia.org/w/index.php?title=Network_function_virtualization&oldid=829341432>. (Mar. 8, 2018), 8 pages.

RFC-8240—Report from the Internet of Things Software Update (IoTSU) Workshop 2016 [online] [retrieved Oct. 12, 2020], Retrieved from the Internet: <URL: https://tools.ietf.org/html/rfc8240>. (Sep. 2017), 27 pages.

Smart Contract—Wikipedia [online] [Retrieved Oct. 12, 2020] Retrieved from the Internet: <URL: https://en.wikipedia.org/w/index.php?title=Smart_contract&oldid=832507043>. (Mar. 26, 2018), 6 pages.

Software-Defined Networking—Wikipedia [online] [Retrieved Oct. 12, 2020] Retrieved from the Internet: <URL: https://en.wikipedia.org/w/index.php?title-Software-defined_networking&oldid=832630205>. (Mar. 27, 2018), 12 pages.

Torrent File—Wikipedia [online] [Retrieved Oct. 12, 2020] Retrieved from the Internet: <URL: https://en.wikipedia.org/w/index.php?title=Torrent_file&oldid=828789784>. (Mar. 4, 2018), 6 pages.

What Is Network Slicing? [online] [Retrieved Oct. 12, 2020] Retrieved from the Internet: <URL: https://web.archive.org/web/20170810034958/https://5g.co.uk/guides/what-is-network-slicing/>. (Aug. 10, 2017), 5 pages.

Office Action for European Application No. 18164451.9 dated Oct. 22, 2021, 8 pages.

First Examination Report for Indian Application No. 202047046316 dated Dec. 3, 2021, 6 pages.

* cited by examiner

ELECTRONIC DEVICE MANAGEMENT

CROSS-REFERENCE TO RELATED APPLICATIONS

This application is a national phase entry of International Application No. PCT/EP2019/057713, filed Mar. 27, 2019, which claims priority to European Patent Application No. 18164451.9, filed on Mar. 28, 2018, the entire contents of which are incorporated herein by reference.

FIELD

Various example embodiments relate to managing electronic devices.

BACKGROUND

Coordinated software upgrades are typically provided by a server adapted to deliver and coordinate software updates. Such a centralized server may maintain a registry holding information about update status and communication.

The Internet of Things (IoT) facilitates further spreading of computational devices that are an integral part of the physical world. Advances in hardware development make it possible to embed connectivity and programmability virtually almost everywhere. Small, inexpensive everyday devices will have considerable computing and storage capabilities. Requirements for device updating are changing as the number of devices increases and their use in safety-critical applications and domains becomes commonplace.

SUMMARY

The invention is defined by the features of the independent claims. Some specific embodiments are defined in the dependent claims.

According to a first aspect, there is provided a method, comprising: generating a smart contract with information of a number of targeted devices to perform an update, providing the smart contract for a distributed ledger, detecting an indication to the distributed ledger on readiness to perform the update by the number of targeted devices, and detecting another indication to the distributed ledger on the performance of the update by the number of targeted devices.

According to a second aspect, there is provided a method, comprising: receiving a smart contract in a distributed ledger with information of a number of targeted devices to perform an update; verifying that the smart contract is signed by a trusted party; receiving the update from an update provider; sending an indication of readiness to perform the update for the distributed ledger; detecting an indication to the distributed ledger about readiness to perform the update by the number of targeted devices; and performing the update in response to the detected indication.

According to a third aspect, there is provided an apparatus, comprising at least one processor and at least one memory including computer program code, the at least one memory and the computer program code being configured to, with the at least one processing core, cause the apparatus at least to: generate a smart contract with information of a number of targeted devices to perform an update, provide the smart contract for a distributed ledger, detect an indication to the distributed ledger on readiness to perform the update by the number of targeted devices, and detect another indication to the distributed ledger on the performance of the update by the number of targeted devices.

According to a fourth aspect, there is provided an apparatus comprising at least one processor and at least one memory including computer program code, the at least one memory and the computer program code being configured to, with the at least one processing core, to cause the apparatus at least to: receive a smart contract in a distributed ledger with information of a number of targeted devices to perform an update; verify that the smart contract is signed by a trusted party; receive the update from an update provider; send an indication of readiness to perform the update for the distributed ledger; detect an indication to the distributed ledger about readiness to perform the update by the number of targeted devices; and perform the update in response to the detected indication.

According to a fifth aspect, there is provided a computer program product, a computer readable medium, or a non-transitory computer readable medium comprising program instructions for causing an apparatus to perform at least the following: generate a smart contract with information of a number of targeted devices to perform an update, provide the smart contract for a distributed ledger, detect an indication to the distributed ledger on readiness to perform the update by the number of targeted devices, and detect another indication to the distributed ledger on the performance of the update by the number of targeted devices.

According to a sixth aspect, there is provided a computer program product, a computer readable medium, or a non-transitory computer readable medium comprising program instructions for causing an apparatus to perform at least the following: receive a smart contract in a distributed ledger with information of a number of targeted devices to perform an update; verify that the smart contract is signed by a trusted party; receive the update from an update provider; send an indication of readiness to perform the update for the distributed ledger; detect an indication to the distributed ledger about readiness to perform the update by the number of targeted devices; and perform the update in response to the detected indication.

An embodiment according to any one of the aspects can comprise alternatively at least one of receiving an indication to the distributed ledger on readiness to perform the update by the number of targeted devices, and detecting another indication to the distributed ledger on the completeness of the performance of the update by the number of targeted devices.

In an embodiment according to any one of the aspects, the smart contract may comprise one or more of:
- an address of the update package, such as a torrent identifier, a hash, or a URL,
- in case of configuration update, the updated configuration information
- information about a threshold number of devices that need to be ready to perform the update or that need to perform the update, such as a threshold number and/or identification information of the devices,
- identifiers of the number of targeted devices that need to perform the update, and
- type of the targeted device(s) and communication method supported by the targeted device(s).

An embodiment according to any one of the aspects can comprise sending to a targeted device and/or receiving by a targeted device at least some of update related information at a predefined radio activity time or time period of the targeted device.

In an embodiment according to any one of the aspects, the smart contract may comprise timing information indicative at least one of:
- time by or at which the update needs to be carried out,
- time by or at which the update is to be fetched,
- time by or at which the update is cancelled if not performed before that.
- time (or time period) at which check if the number of targeted devices have indicated the readiness to perform the update, and
- time (or time period) at which to activate radio for listening to or checking smart contract updates.

In an embodiment according to any one of the aspects, at least some of the indications are stored in the smart contract.

In an embodiment according to any one of the aspects, the smart contract is configured to cause the initiation of the update process in the targeted device.

In an embodiment according to any one of the aspects, the smart contract is configured to check if indications have been received from a threshold number of targeted devices.

In an embodiment according to any one of the aspects, the distributed ledger is a blockchain ledger, and the smart contract is provided and updated by blockchain transactions.

In an embodiment according to any one of the aspects an apparatus comprising means for performing:
- receiving a smart contract with information of a number of targeted devices to perform an update for a distributed ledger,
- detecting an indication to the distributed ledger on readiness to perform the update by the number of targeted devices, and
- detecting another indication to the distributed ledger on performance of the update by the number of targeted devices.

In an embodiment according to any one of the aspects, the indication of performance is sent to update provider, for example.

BRIEF DESCRIPTION OF THE DRAWINGS

Some example embodiments will now be described with reference to the accompanying drawings.

EMBODIMENTS

The invention provides improved management of updates, such as software and/or configuration updates, to a number of electronic devices by applying distributed ledger technology. The purpose of the distributed ledger is to record and enforce verifiable transactions and order of events. A distributed ledger may be applied for controlling access to and delivery of the update. A distributed ledger can be considered a general database synchronized between many parties, which, at successive time instances, comprises successive states of consensus about a particular matter, e.g., on device update associated with the number of targeted devices. Such states may be reached by many parties, e.g., nodes in a peer-to-peer (P2P) network, following a decentralized consensus algorithm. This may provide an agreement between the nodes without assuming trust between them. Distributed ledger technology and smart contracts are applied in order to perform coordinated, transactional device updates in a distributed fashion without a single point of failure. The smart contract may comprise information in and/or for a distributed ledger at least on carrying out an update to a number of targeted devices and interacting with the targeted devices. The update procedure may thus be controlled on the basis of and/or by the smart contract stored in the distributed ledger.

Figure 1:
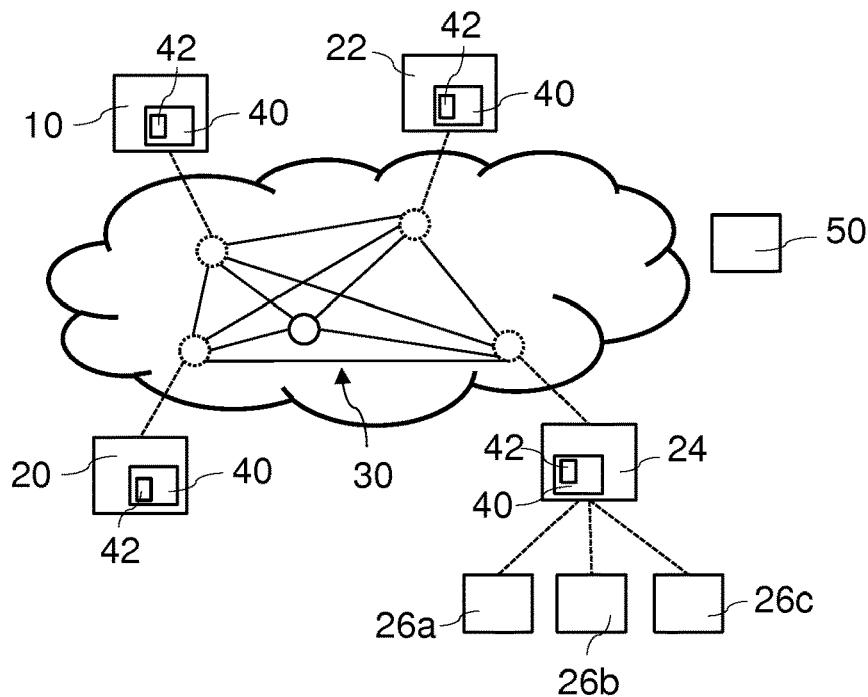
FIG. 1 illustrates an example system in accordance with at least some embodiments.

FIG. 1 illustrates an example system in accordance with at least some embodiments. The system comprises a number of devices 10, 20, 22, 24 connected to and configured to operate as nodes of a distributed network 30. Block 10 refers to an entity initiating or causing an update, such as a device or network management system or device, and is hereafter referred to as an update initiator. In some embodiments, the update initiator is comprised by a device management system (DMS), which may also comprise further entities.

The update initiator 10 may be configured to initiate an update procedure for at least some of the devices 20, 22, 24 connectable to the distributed network 30 by generating a smart contract 42 comprising information on and for the targeted devices to perform the update.

The update initiator 10 may be a party trusted by targeted devices and/or there may be a further trusted party signing the smart contract. As illustrated in FIG. 1, at least some of the devices 10, 20, 22, 24 operating as nodes of the distributed network 30 maintain a distributed ledger 40. The smart contract provided by the update initiator 10 is stored in the distributed ledger 40 after the smart contract has been verified.

The distributed network 30 may be a private or public distributed network, and may be built on currently available blockchain system, for example. The nodes may be physical devices connectable locally by at least one a wireless network, such as a Wi-Fi network and/or a cellular network. However, it is to be appreciated that multiple underlying networks and/or different connections may be applied to connect nodes of the distributed network 30. At least some nodes of the distributed network 30 may share network state information storing at least partly the transactions and history carried out in the network.

The system may comprise further devices 26a, 26b, 26c connectable to and/or controllable by a node 24 of the distributed device. In some embodiments, the system comprises one or more IoT devices configurable on the basis of at least a portion of the update, such as devices 24, 26a-c. One or more of these IoT devices may operate as nodes of the respective distributed network 30. The system may also comprise an update provider 50, such as a software repository server, which may be part of the DMS and connected to network 30.

A user device, which may also be referred to as equipment (UE), may be a device of the user associated with the update and may at least in some embodiments represent the user in the system. The user device may be applied for adding, controlling, and/or using information which is stored in the distributed ledger. In some embodiments, the user device 10 is capable of operating as a node 20, 22, 24 of distributed network 30. In some embodiments, the update initiator 10 adapted to generate the smart contract 42 is a user device.

The nodes in the distributed network 30 may comprise corporate, authority, and/or user devices, such as a server, a desktop/tablet/laptop computer, a smartphone, a domestic appliance, building automation device, entertainment system device, a vehicle unit, a wearable, or any other suitable electronic device. The system may comprise an administrator or management node, a hub, relay or other kind of intermediate device for connecting a node to further networks or services, such as another distributed or centralized computing system or a cloud service. The nodes are mutually addressable in a suitable way, for example, they may be connectable to an internet protocol, IP, network. Messages released into the IP network with a recipient address are routed by the network to the recipient node identified by the recipient address. IP is not the only suitable networking technology used, for example, other peer-to-peer networking models are also suitable.

Figure 2:
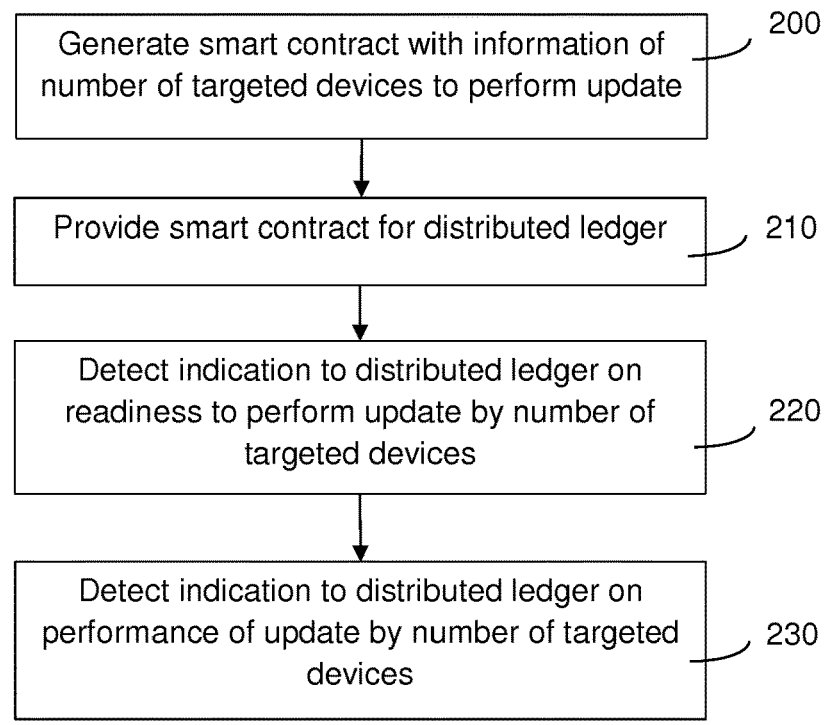
FIGS. 2 and 3 illustrate methods in accordance with at least some embodiments.

FIG. 2 illustrates a method according to some embodiments. The method may be applied for managing an update, such as a software update or a configuration update, to a number of targeted devices by a node of a distributed network. The method may be implemented in a communications apparatus or device capable of causing an update to a number of devices, such as a network management device, a network operator device, an IT administrator device, or a DMS, for example. The method may be implemented by the update initiator 10.

A smart contract with information of a number of targeted devices to perform an update is generated 200. The smart contract is provided 210 for a distributed ledger for the number of targeted devices, such as for distributed ledger 40 and for the nodes 20, 22, 24. The smart contract may thus be sent or otherwise provided for publication in the distributed ledger, and the publication can occur as public or private.

An indication to the distributed ledger on readiness to perform the update by the number of targeted devices is detected 220. An indication of being ready to perform the update may be received from each targeted device. After indications from all or appropriate number of targeted device are received to the distributed ledger, the indication of the number of targeted devices may be considered to be received and detected 220 by the apparatus implementing the method.

An indication to the distributed ledger on performance of the update by the number of targeted devices is received 230. Thus, the distributed ledger may be updated to indicate completion of the performance of the update to the number of targeted devices. In some cases the completion can comprise completion degree, e.g. 50% or 80% completed, even though other degree can occur. In some embodiments the completion degree can comprise also the estimated time to be complete and in that case the system can calculate how long it will yet take before completion. The completion degree can use the active time of the targeted device to inform completion degree. After completing installations the new update will be used in the targeted devices.

Figure 3:
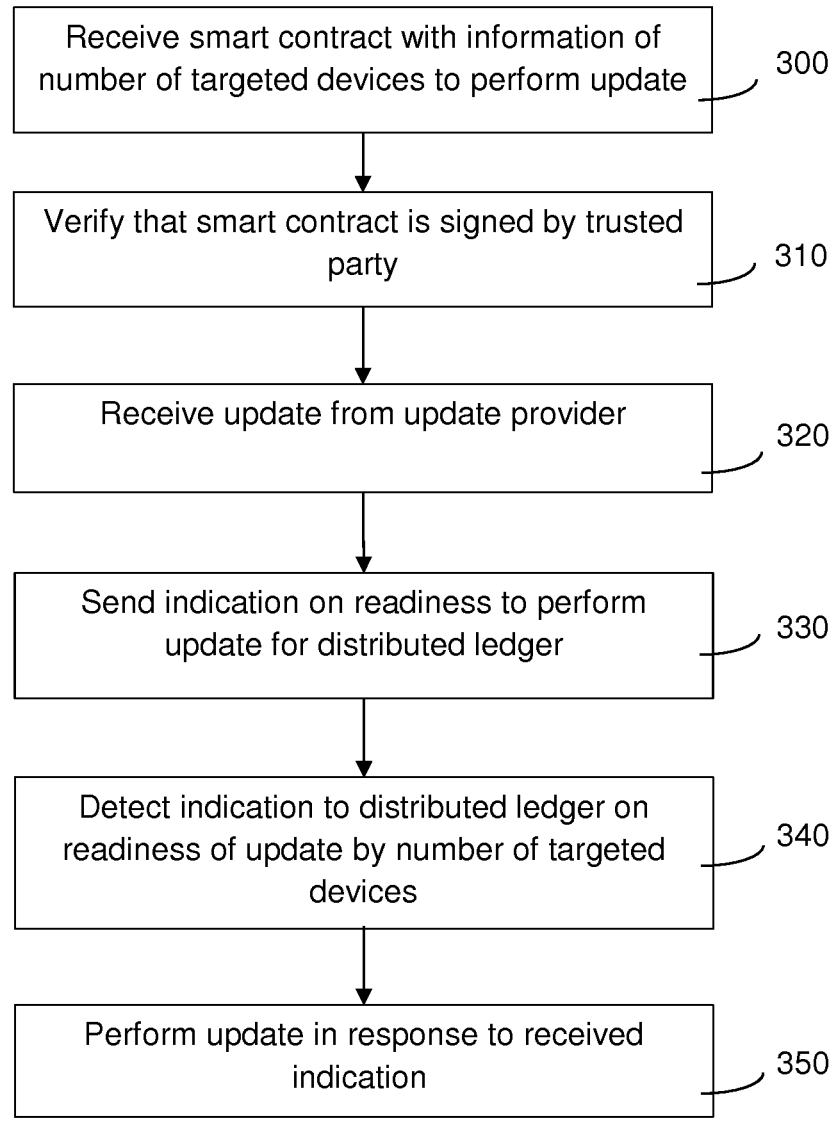

FIG. 3 illustrates a method according to some embodiments. The method may be applied for arranging an update on the basis of a smart contract in a distributed ledger in a targeted device, which may be a node of a distributed network. The method may be implemented in an apparatus or device capable of causing an update on the basis of a received smart contract, such as a user device, a machine-to-machine (M2M) or IoT, e.g., a Narrowband IoT (NB-IoT) device, a network or system management device, a network operator device, for example. The method may be implemented by a targeted device, such as at least some of nodes/devices 20, 22, 24, 26a-c. However, it is to be noted that the method may be applied in a device causing the update in other devices, such as the node 24 triggering the update in devices 26a-26c, which do not have to be nodes of the distributed network 30, e.g. in case of domestic appliances, building automation devices, etc. This may improve e.g. scalability for different approaches.

A smart contract with information of a number of targeted devices to perform an update is received 300. The smart contract may be published in the distributed ledger after block 210 by initiation of the update initiator 10. Block 310 verifies that the smart contract is signed by a trusted party, such as the update initiator 10. The update is received 320 from an update provider. Block 320 may involve or be preceded with a specific request to receive or download the update from the update provider, which may be the update initiator or another entity, such as a software or configuration repository.

An indication of readiness to perform the update is sent 330 for the distributed ledger. Block 330 may comprise causing provision of the indication to be published in the distributed ledger. An indication is detected 340 to the distributed ledger on readiness to perform the update by the number of targeted devices. The update is performed 350 in response to the detected indication.

The apparatus performing the method of FIGS. 2 and/or 3 may be configured to monitor the updates from the targeted devices and detect the indication to the distributed ledger in block 220, 230, and/or 340 when all or appropriate predefined number of the targeted devices have provided their indications to the distributed ledger. In another embodiment, in block 220, 230, and/or 340 an indication is received from the distributed ledger after all or appropriate number of the targeted devices has provided their indications to the distributed ledger.

In some embodiments, at least some of the indications 220, 230, 330, 340 are stored in the smart contract 42. The sending 330 of the indication may thus refer to sending the indication for updating the smart contract 42 in the distributed ledger 40 stored in the nodes of the distributed network 30. The detection of the indication to the distributed ledger 220, 230, 340 may refer to detecting an indication (received) for storing or already stored in the smart contract 42. The indication 220, 330 on a readiness to perform the update and/or the indication on the performance of the update may be in a form of at least one signature to the smart contract 42 stored in the distributed ledger 40. The apparatus performing the method of FIGS. 2 and/or 3 may issue a smart contract state query to the smart contract about the indications, e.g. "Indications received from number of targeted devices?( )". The smart contract may respond to the query, e.g. with true if enough indications from targeted devices is received.

The distributed ledger 40 enables a decentralized, auditable, and tamper-proof registry of privacy permissions for managing device updates. There are benefits for using the present decentralized system instead of centralized provision of device updates. For instance, each (targeted) device can perform the determination of software update installation or configuration update or cancellation independently, and the update may be performed within time scheduled by the update initiator 10. This also allows publishing, such as the indication 330, to the distributed ledger from any location if the publisher is appropriately equipped for the publication, for instance has appropriate keys to sign the submission. There is no single point of failure that an attacker could attack for stopping updates. There is no need for a mutable, shared update registry.

Specific further advantages are available in context with IoT or other similar systems in which there is a need to perform software or configuration upgrades to a large number of devices in a coordinated, transactional fashion. Additional benefits are subject to implementation choices and further embodiments illustrated below. For instance, the distributed ledger may be updated to store information about the time and order in which each of the devices received the updates. In an additional embodiment, information about installation or cancellation phases can also be added to the smart contract, thus keeping a detailed, shared ledger of the entire distributed update process.

It will be appreciated that FIGS. 2 and 3 illustrate some embodiments for the update procedure and a number of further steps and embodiments may be applied in combination of the blocks in FIGS. 2 and 3, some of which are illustrated further below.

Access to the update information may be authorized for the requesting device directly upon the response/validation or after further intermediate action(s). Access parameters for accessing the update information, in some embodiments a cryptographic key for decrypting update package received and stored in encrypted form, may be provided to the node, in some embodiments as additional blocks of FIGS. 2 and 3.

There may be an additional block, after performing 350 the update, of sending an indication for the smart contract 42 in the distributed ledger 40 that the update has been performed.

The smart contract 42 may be removed from the distributed ledger 40 in response to receiving 230 the indication of the performance of the update by the number of targeted devices.

In some embodiments, the smart contract 42 can be maintained and updated in the distributed ledger 40 after the performed update. Only some details of the content of the smart contract may be transmitted 210, 300, i.e. less traffic is generated. For example, information of additional targeted devices to be updated can be included.

An indication that the update has been received may be sent after block 320 to the update provider, such as a DMS.

In some embodiments, the smart contract 42 is provided 210 for the distributed ledger 40 by a transaction, and subsequent updating of the distributed ledger (such as the indications 330) is carried out by transactions, such as blockchain transactions, provided to the distributed ledger. Provision of a transaction to the distributed ledger may refer to sending the transaction for further node(s) of the distributed network 30, such as for validation by validating nodes and subsequent publication in the respective distributed ledger. The transactions are cryptographically signed and represent respective transaction issuer's commitment in the transaction. For example, a transaction for providing the smart contract to the distributed ledger 40 may be signed by secret key of the update initiator 10. Validation of a transaction may comprise authentication of associated entities, in some embodiments verifying the cryptographic signature in the transaction, and may comprise checking entitlement of a requesting entity to the requested transaction. In some embodiments, transactions are validated by blockchain miner nodes on the basis of applied blockchain validation mechanism. After validation of the transaction(s), the public distributed ledger is updated with the transaction(s).

It will be also appreciated that there may be further blocks in FIGS. 2 and 3 regarding transaction validation after providing a transaction to the distributed ledger. Further, the transaction may be published in the distributed ledger and the method may proceed to a subsequent step only after successful validation of the transaction.

In some embodiments, updates 220, 230, 330, 340 associated with the software or configuration update and the smart contract 42 may be identified amongst transactions stored in the distributed ledger 40. Transactions related to the update may be provided to the distributed ledger on the basis of and identifying the smart contract. An associated node 10, 20, 22, 24 may thus after block 210 and initiation of the update procedure search through the distributed ledger to identify transaction(s) associated with the user, such as the update initiator's public key, update identification, transaction ID, or other identification (stored in the distributed ledger and/or smart contract) as search input.

The smart contract 42 may comprise parameters for controlling the update in the targeted devices. The update initiator 10 may include 200 in the smart contract one or more of:
- an address of the update package, such as a torrent identifier, a hash or a URL,
- in case of configuration update, the updated configuration information
- information about a threshold number of devices that need to be ready to perform the update or that need to perform the update, such as a threshold number and/or identification information of the devices,
- identifiers of the number of targeted devices that need to perform the update, and
- type of targeted device(s) and communication method supported by the targeted device(s), such as M2M, NB-IoT.

At least some of the parameters may be encrypted to prevent non-targeted devices with access to the distributed ledger 40 to observe the parameters. The smart contract may comprise cryptographic parameters for decrypting the encrypted parameters. In some embodiments, the cryptographic parameters are separately provided to the targeted devices, e.g. by a message from the initiator to each of the targeted devices and/or in some embodiments using active time of targeted devices when sending the message or messages.

The targeted devices are configured to initiate and carry out the update according to the parameters. Block 220 and/or 340 may comprise or be followed with checking if a threshold number of devices have indicated in the smart contract 42 that they are ready to perform the update, wherein the threshold number of devices is indicated in the smart contract. In response to detecting that the threshold number of devices have indicated in the smart contract that they are ready to perform the update, the update may be performed 350.

In some embodiments, the smart contract 42 comprises timing information controlling timing of actions associated with the update. For example, the update initiator may be adapted to include in the smart contract timing information indicative at least one of:
- time by or at which the update needs to be carried out,
- time by or at which the update is to be fetched,
- time by or at which the update is cancelled if not performed before that.
- time (or time period) at which check if the number of targeted devices have indicated the readiness to perform the update, and
- time (or time period) at which to activate radio for listening to or checking smart contract updates.

The targeted devices are configured to initiate and carry out the update according to the parameters. In an example embodiment, the targeted device may modify its radio activation settings in accordance with the smart contract timing information, or keep activation settings of the device as before if the smart contract timing information allows that, wherein the power consumption can be reduced further. If the targeted device is not a node of the distributed network, such as an IoT device, such targeted device 26a-c may be configured by a node 24, on the basis of the smart contract 42. For example, such targeted device 26a-c may be instructed and configured by the node 24 to activate its radio and connect the node 24, or another entity, such as the update provider, in accordance of the timing information. The node 24 may be configured to act as a delegate device on behalf of the targeted device 26a-c not storing the distributed ledger and e.g. send the indication 330 in response to an indication from the targeted IoT device.

In some embodiments some of the above-illustrated parameters may be included in the smart contract 42, and there may be further parameters affecting the update procedure. For example, it is not necessary to specify the threshold number, but all indicated target devices are expected to act. Furthermore, the smart contract may comprise rules for timed changes of configuration, e.g. so that at first configuration is used at first time window, and second configuration for second time window. In a further example embodiment, the smart contract comprises both information about new software version and configuration to be used after software upgrade.

The smart contract 42 may comprise logic and execute or trigger transaction(s) associated with the update procedure. The smart contract may comprise instructions causing the number of targeted devices to carry out at least one of fetch the update and perform the update. In some embodiments, the smart contract comprises code/program specified by a DMS or another entity that can be executed by the distributed network automatically according to the condition set in the code. Thus, the smart contract may be considered to operate as an autonomous update agent in the network.

In some embodiments, the smart contract 42 may be configured to cause the initiation of the update process in the targeted device. For example, the smart contract may cause the targeted device to fetch the update and enter block 320.

In a further example embodiment, the smart contract 42 may be configured to execute the check in connection with block 220 if indications have been received from the threshold number of targeted devices. If yes, the smart contract may provide the indication of block 340, which could also be in a form of update instruction, to the targeted device(s). Thus, the smart contract may be configured to push at least some of the indications to a device carrying out the method of FIG. 2 or 3.

The smart contract 42 may comprise code for verifying the indications and/or other information from the targeted devices and potentially from other associated entities.

In some embodiments, the distributed network 30 is a blockchain based network, the distributed ledger 40 is a blockchain ledger, and the distributed ledger 40 and the smart contract 42 are provided and updated by blockchain transactions. The node 10, 20, 22, 24 may be a light or full blockchain node. Information provided in a blockchain transaction, such as the above illustrated smart contract and update related indications, may be stored in the blockchain ledger in response to validation of the respective blockchain transaction.

Figure 4:
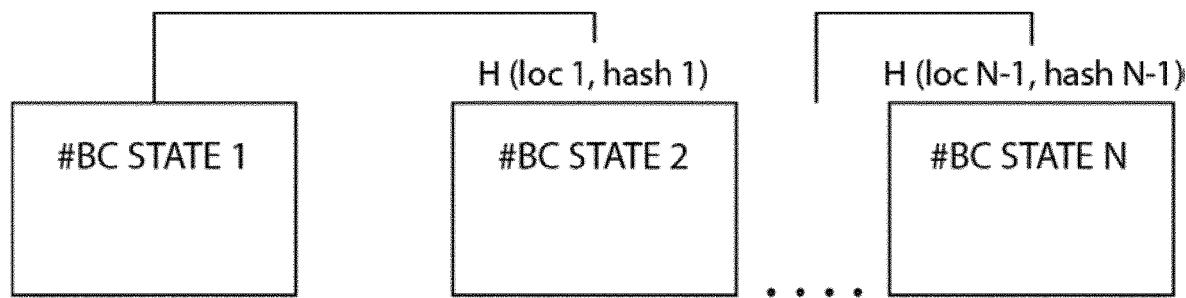
FIG. 4 illustrates a blockchain.

With reference to the simplified example of FIG. 4, the blockchain is an ordered sequence of blocks. When a new block is established, it is added to the blockchain as a most recent established block. A block comprises a time-stamped batch of transactions representing the state of the block at the time. A block may further comprise a hash pointer H with location indicator 'loc' and hash value 'hash' to a prior block, which immediately precedes the block in the blockchain, linking thus the blocks together. Blockchain state information shared by the nodes may store all the transactions and history carried out in the respective distributed network 30. For example, after validating a transaction for publishing 210 the smart contract, a new block comprising updated blockchain network state information may be added.

Each node may comprise the ledger whose content is in sync with other ledgers. The nodes may validate and commit transactions in order to reach consensus. Each node may have their own copy of the ledger which is in some embodiments permission-controlled, so participants see only appropriate transactions. Changes in resource ownership in the blockchain take the form of blockchain transactions secured by strong cryptography. A blockchain transaction may comprise an identifier of a new owner, that is the recipient, of the resource, together with a cryptographic signature of the previous owner, that is the sender, such that malicious attackers cannot re-assign resources they do not own.

To establish a next block, the transaction is provided (e.g., by or in response to block 210, 330) into the blockchain network which refers to a dissemination method suitable for the context, which will cause the transaction to be communicated to at least some of the nodes of the network in general. Reaching each and every node with each and every transaction is not strictly necessary.

A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. Once a miner discovers the proof-of-work, it can publish the block, which other nodes of the system will then add to the blockchain as the new most recent established block with proof of work code field. In case the miner node discovers a proof-of-work based on an incomplete set of transactions, for example if some transactions did not reach the miner node, other nodes in the network will not accept the block into the blockchain, and it will be excluded from a consensus version of the blockchain in the system.

Although discussed above in terms of proof-of-work, in some embodiments a proof-of-stake may be used instead of, or additionally to, a proof-of-work. In a proof-of-stake based system, a new block may be accepted once a predetermined fraction of resources are proven as owned by nodes ready to accept the new block version.

Once a new block is established, the blockchain becomes longer. A transaction is considered the more reliable, the larger the number of blocks established since the block where the transaction is comprised. This is since transactions are hashed into the chain of blocks, and discrepancies in the block chain are resolved as the block chain gets longer. In each next block N in the sequence, a hash of the previous block hash N−1 may be included along with the transactions, attaching the blocks to each other to form the chain. Hashes linking the blocks together to form a chain may be referred to as Merkle hashes. Maliciously modifying a transaction in a block far down the chain would involve re-doing the work of finding proofs for all subsequent blocks, since the input to the hash function for the block comprising the transaction would be changed, causing the resulting hash value, with the proof in that block, to no longer be disposed in the desired area in the output space of the hash function.

Figure 5:
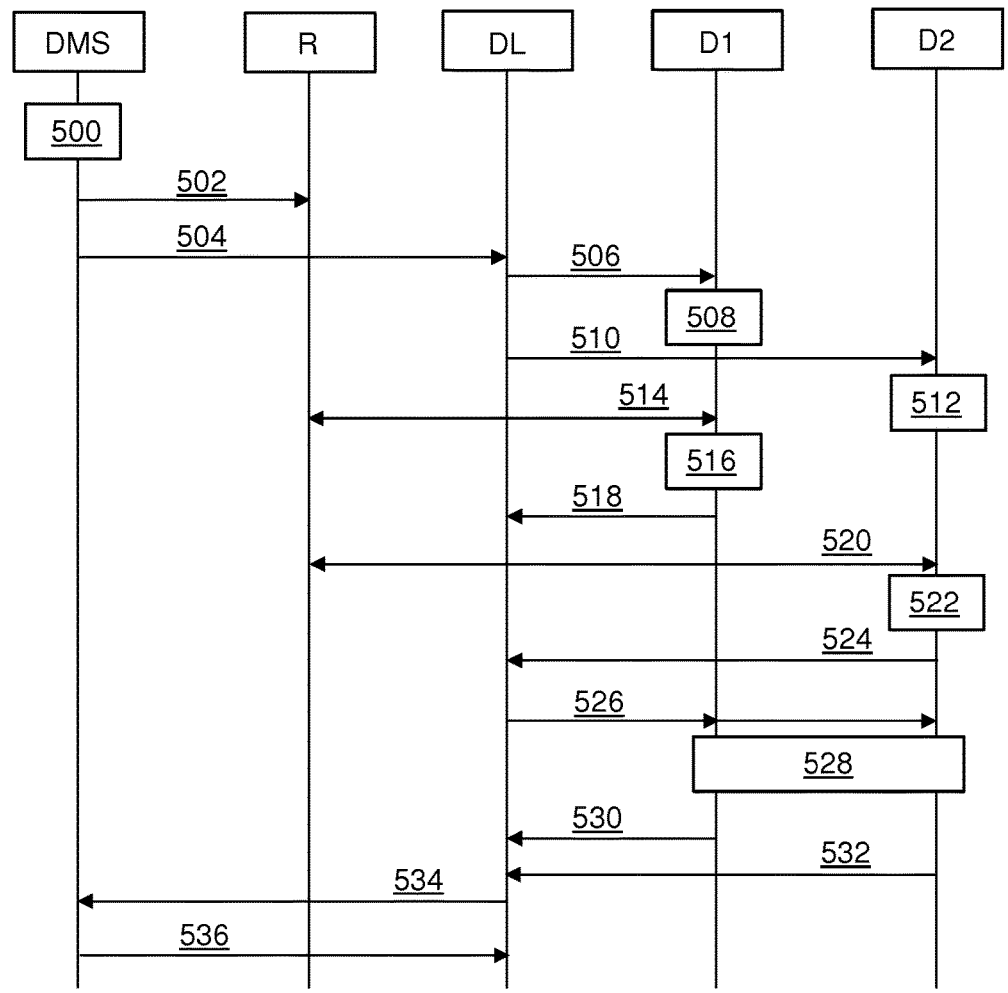
FIG. 5 illustrates signalling in accordance with at least some embodiments.

FIG. 5 illustrates a signalling example of according to some embodiments. A DMS creates 500 a smart contract with information about devices that need to perform a software (or configuration) update. The DMS may include in the smart contract a reference to a software image with hash of the software image. The DMS may also send 502 the software update to be available in a repository R, which may be a distributed repository, such as Bittorrent, or a central repository.

Once software update is ready to be downloaded, the DMS publishes 504 the smart contract in the distributed ledger DL, using Ethereum, for example, so that at least targeted devices can see it. In the present example, a first device D1 and a second device D2 detect 506, 510 on the basis of the smart contract that they are supposed to upgrade software at a given date and time (deadline), for example. The devices D1 and D2 may be IoT devices or devices controlling IoT devices, for example. This may be detected on the basis of these devices being identified in the smart contract. Alternatively, the devices D1, D2 may be informed or instructed by the DMS. The devices may then in block 508 and 512 verify the smart contract and that it is signed by trusted DMS.

In one embodiment the DMS may have the information of the radio activity time or time period of the targeted devices in order to send the smart contract within the time or time period when the radio of the targeted device is active to get the smart contract and/or fetch/download the software image. In one embodiment the DMS gets the time information from the IoT device when the IoT device sends data (e.g. sensor data) to a network, indicative of the receiver of the IoT device being ready for receiving. The DMS may be configured, to avoid losing any earlier defined transmission of data by checking in IoT device scheduled transmission time to decide the time of the update and synchronize that with smart contract schedule, if possible. At least some targeted IoT devices may have different times for being active and because of that a communicating device, such as a mobile device MS or a network element may be configured to communicate separately to appropriate IoT devices at the respective times.

The devices D1, D2 may then proceed to fetch/download 514, 520 the new software image. The devices may be configured to verify 516, 522 that the software image matches to a hash in the smart contract. In response to successful verification, the devices may indicate 518, 524 to the distributed ledger that they are ready to perform update.

The devices D1, D2 may be configured on the basis of the smart contract to check, once the predetermined date and time (deadline) is reached, if the required number of devices have indicated in the smart contract that they are ready to perform the update. If so, the devices obtain 526 the indication illustrated in connection with block 340, and perform 528 the software update. After successfully performing the update, the targeted devices may indicate 530, 532 again to the smart contract in the distributed ledger that they have updated the software. The targeted devices may send the indication during the time period they have set the radio in active condition. The DMS receives indications of updates in the smart contract. Once indication of all targeted devices is received 534, the DMS can remove 536 the smart contract from the distributed ledger.

Figure 6:
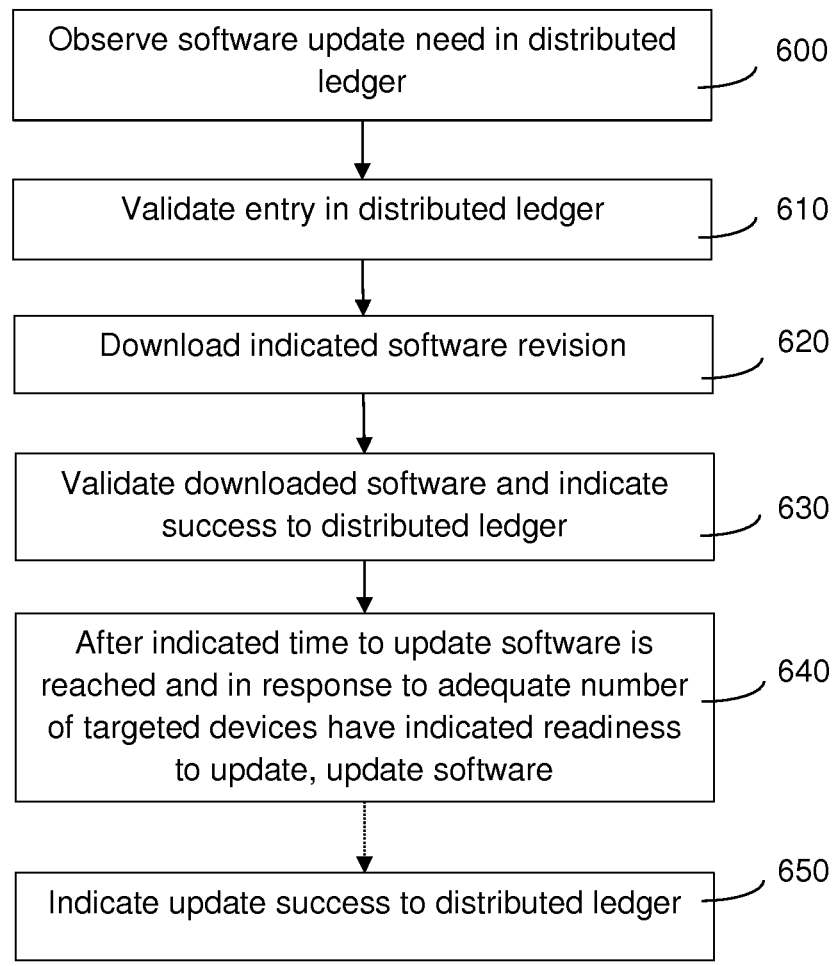
FIG. 6 illustrates a method in accordance with at least some embodiments.

FIG. 6 illustrates a method for a (targeted) device being updated, such as one or more of devices 20, 22, 24, 26a-c. Need for software update in distributed ledger is observed 600, e.g. on the basis of a new smart contract in which the device carrying out the method of FIG. 6 is identified. The associated entry in the distributed ledger is validated 610.

In response to successful validation, software indicated e.g. by the smart contract in the distributed ledger 40 is downloaded 620. The downloaded software is validated and success is indicated 630 to the distributed ledger. The targeted device may in block 640 wait until indicated time to update software is reached, check if enough targeted devices have indicated readiness to update, and if the threshold number is reached, update the software. Optionally, update success may be indicated 650 to the distributed ledger.

The time period the software is downloaded may influence the activity time of the radio of the targeted device. For example, on the basis of the smart contract timing information, the radio may be configured to be longer active than it was earlier planned, or the radio of the targeted device is configured to be active more frequently within certain period of time.

In some embodiments, the update is a configuration update. The configuration update may comprise configuration parameters for configuring operation of one or more devices, and/or access data for accessing one or more devices connectable directly or indirectly to the distributed network 30 and/or services or applications by or via the one or more devices. As already indicated, these devices may be nodes 20, 22, 24 of the distributed network and/or devices 26a-26c connectable to and/or controlled by the node 24. For example, a building automation control device may operate as a node of the private network and send control signals on the basis of the configuration update to actuator devices, such thermostats, air condition devices, locks, etc.

It is to be appreciated that although references were made in FIGS. 5 and 6 to software updates, similar actions may be applied for configuration updates. Configuration information to be added and/or to replace earlier configuration information in the targeted devices may be provided via the distributed ledger or the smart contract, or retrieved from a configuration information repository in response to detecting the smart contract similarly as illustrated in FIGS. 5 and 6 for the software update.

In addition to above-illustrated example embodiments, presently disclosed features are applicable also to other domains. For example, in software configuration management there may be a need to deliver new software configurations, i.e. files describing a new software configuration, in a transactional fashion. At least some of the above-illustrated features may be applied for providing software configurations to a number of targeted devices by a smart contract. For example, a point-of-sales terminal may need to get price list update or the like to enable to handle transactions correctly.

Furthermore, at least some of the above-illustrated features may be applied to domains in which a large number of devices need to operate as a single coordinated "swarm". Examples of such swarm computing solutions include, e.g., drones and robots that need to receive instructions so that all those units can operate as a coordinated unit. Operation of such sets of devices may be effectively coordinated and configured by applying the distributed ledger and smart contract as illustrated above.

It is to be noted that at least some of the above illustrated features may be applied in systems applying network virtualization. Hence, network functions or nodes illustrated above, such as the nodes 10, 20, 22, 24, may be shared between two physically separate devices forming one operational entity.

In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to software containers on a single system. For example, instances of 5G network functions can be instantiated as virtual functions in a network function virtualization (NFV) architecture.

In another example besides IoT or end-node SW update scenario, at least some of the above illustrated features are applied to configure entities enabling cellular network slicing solutions, such as used in 5G networks. In such scenarios, there may be a distributed ledger outside of individual network slices, such as operated on network provider's control plane. The distributed ledger and the smart contract may be applied to distribute configuration updates related to creating, deleting and controlling variety of network slices supported by the physical network infrastructure. This control can include starting, stopping and/or modifying NFVs or manage software defined networks (SDNs).

For example, there could be a smart contract that comprises a configuration (or a pointer thereto) of a new network slice, and this smart contract is distributed to variety of physical or virtual network entities. Once all entities are ready, and at an indicated time, the entities take configuration into use and hence create the new network slice. Similarly changes or terminations of network slices can be configured via the distributed ledger.

Some of the benefits of using distributed ledger for arranging the updates is that authorizations can be tracked by all nodes. For example, a virtual operator or customer may create a smart contract for significant network slice configuration update, but the physical and virtual entities that implement the network slice do not accept the configuration before it has first been signed by the physical network operator. It could be that some updates could be carried out via a distributed ledger that does not require an authority to sign the contract before nodes accept the configuration, but for a set of configuration approval would be required. For example, changes that do not change traffic volumes, quality of service (QoS), or cost could be carried out directly, but those that alter on service level or resource usage may be set to require physical operator acceptance. Furthermore, the distributed ledger may comprise history of all changes, and in case of failure might also help determine which was the configuration that worked—and thus help returning to working configuration.

According to an aspect, there is provided a system, comprising at least one virtual network entity, the system comprising means for performing:
  generating a smart contract with information of a number of targeted devices to perform an update,
  providing the smart contract for publication in a distributed ledger,
  receiving a smart contract published in a distributed ledger with information of a number of targeted devices to perform an update;
  verifying that the smart contract is signed by a trusted party;
  receiving the update from an update provider;
  sending an indication of readiness to perform the update for the distributed ledger;
  detecting an indication to the distributed ledger on readiness to perform the update by the number of targeted devices,
  performing the update in response to the detected indication; and
  detecting an indication to the distributed ledger on performance of the update by the number of targeted devices.

According to an embodiment of the above aspect, wherein the system is configured to at least generate the smart contract for network slice configuration update by a virtual operator or customer entity, and the system is configured to at least receive the smart contract and perform the update by at least one physical and/or virtual entity implementing the network slice. At least some of the above-illustrated further embodiments may also be applied in the system comprising the at least one virtual network entity.

An electronic device comprising electronic circuitries may be an apparatus for realizing at least some embodiments. The apparatus may be or may be comprised in a computer, a laptop, a tablet computer, a cellular phone, a machine to machine (M2M) device, a wearable device, a base station, access point device, a network management or control device, a server, or any other apparatus provided with communication capability. In some embodiments, the apparatus carrying out at least some of the above-described functionalities is comprised in such a device, e.g. the apparatus may comprise circuitry, such as a chip, a chipset, a microcontroller, or a combination of circuitries for or in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 7:
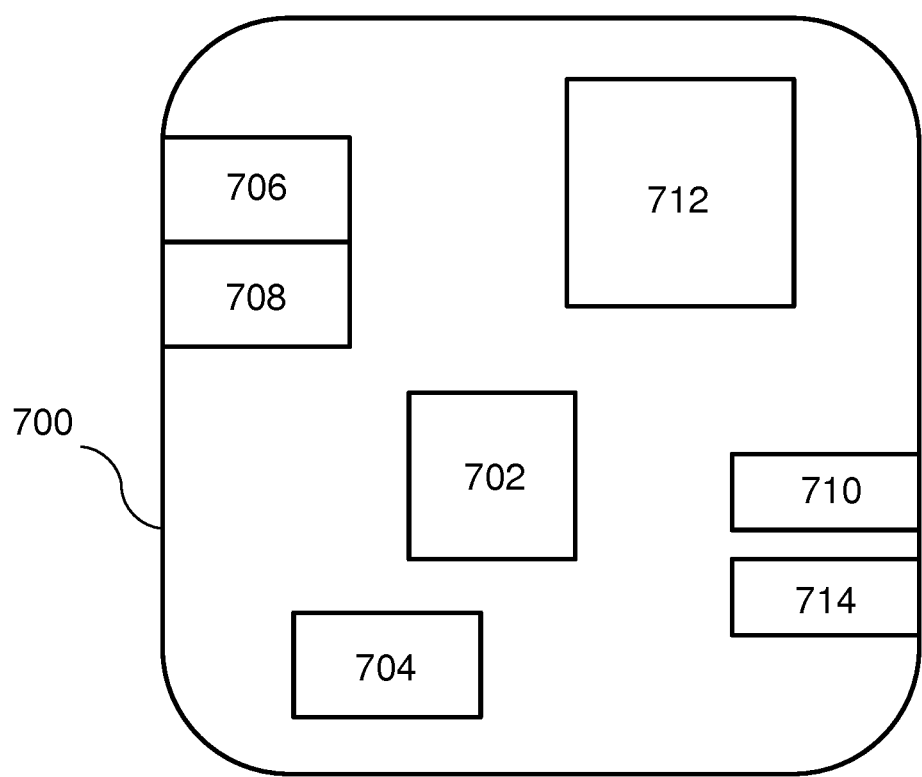
FIG. 7 illustrates an apparatus in accordance with at least some embodiments.

FIG. 7 illustrates an example apparatus capable of supporting at least some embodiments. Illustrated is a device 700, which may comprise a communications device, in some embodiments arranged to operate as a node in a blockchain-based system. The device may be arranged to operate as the update initiator 10 and/or the targeted device 20, 22, 24, 26a-c, and carry out at least some of the embodiments illustrated in connection with FIGS. 1 to 6. The device may include one or more controllers configured to carry out operations in accordance with at least some of the embodiments illustrated above.

Comprised in the device 700 is a processor 702, which may comprise, for example, a single- or multi-core processor wherein a single-core processor comprises one processing core and a multi-core processor comprises more than one processing core. The processor 702 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by executing computer instructions, to perform action to perform at least some of the presently disclosed features.

The device 700 may comprise memory 704. The memory may comprise random-access memory and/or permanent memory. The memory may comprise at least one RAM chip. The memory may comprise solid-state, magnetic, optical and/or holographic memory, for example. The memory may be at least in part accessible to the processor 702. The memory may be at least in part comprised in the processor 702. The memory 704 may be means for storing information. The memory may comprise computer program code comprising computer instructions that the processor is configured to execute. The memory, processor and computer program code may thus be configured to cause the device 700 to perform at least some of the presently disclosed features. The memory may be at least in part comprised in the processor. The memory may be at least in part external to the device 700 but accessible to the device. For example, control parameters affecting operations related to causing the above-illustrated transactions and related information may be stored in one or more portions of the memory and used to control operation of the apparatus.

Further, the memory may comprise device-specific cryptographic information, such as secret and public key of the device 700. The transactions may be signed with a private key associated with the respective device or user. The apparatus may be provided with a public-private key pair at manufacture. The private key may be stored on the certifying device's secured memory portion, such that it cannot be tampered with and the private key cannot be stolen. Moreover, the secured portion may also hold the hashing and signing logic.

The device 700 may comprise a transmitter 706. The device may comprise a receiver 708. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, wireless local area network, WLAN, and/or Ethernet standards, for example. The device 700 may comprise a short range communication, SRC, transceiver 710. The SRC transceiver may support at least one SRC technology, such as SRC, Bluetooth, Bluetooth Low Energy, or similar technologies. The cellular, other wide network technologies and short range communications may interact in the device in parallel or any other way. Other technology or sensed activity may trigger the other technology to be used or the sending of indication of acknowledgement of software update or readiness of download/fetch update from the targeted device to DMS.

The device 700 may comprise user interface, UI, 712. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 704 or on a cloud accessible via the transmitter 706 and the receiver 708, or via the SRC transceiver 710, and/or to play games.

The device 700 may comprise or be arranged to accept a user identity module or other type of memory module 714. The user identity module may comprise, for example, a subscriber identity module, SIM, and/or a personal identification IC card installable in the device 700. The user identity module 714 may comprise information identifying a subscription of a user of device 700. The user identity module 714 may comprise cryptographic information usable to verify the identity of a user of device 700 and/or to facilitate encryption and decryption of communication effected via the device 700, such as private and/or public keys for creating and validating cryptographic signatures.

The processor 702 may be furnished with a transmitter arranged to output information from the processor, via electrical leads internal to the device 700, to other devices comprised in the device. Such a transmitter may comprise a serial bus transmitter arranged to, for example, output information via at least one electrical lead to memory 704 for storage therein. Alternatively to a serial bus, the transmitter may comprise a parallel bus transmitter. Likewise the processor may comprise a receiver arranged to receive information in the processor, via electrical leads internal to the device 700, from other devices comprised in the device 700. Such a receiver may comprise a serial bus receiver arranged to, for example, receive information via at least one electrical lead from the receiver 708 for processing in the processor. Alternatively to a serial bus, the receiver may comprise a parallel bus receiver.

The device 700 may comprise further devices not illustrated in FIG. 7. For example, the device may comprise at least one digital camera or other user media recording device. Some devices may comprise a back-facing camera and a front-facing camera. The device may comprise a fingerprint sensor arranged to authenticate, at least in part, a user of the device. In some embodiments, the device lacks at least one device described above. For example, some devices may lack the SRC transceiver 710 and/or the user identity module 714.

The processor 702, the memory 704, the transmitter 706, the receiver 708, the SRC transceiver 710, the UI 712 and/or the user identity module 714 may be interconnected by electrical leads internal to the device 700 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected.

It is to be understood that the application of the disclosed embodiments are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 6 may be taken in isolation or further combined together.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the preceding description, various operational and structural specific details are provided, to provide a thorough understanding of the embodiments. One skilled in the relevant art will recognize, however, that various embodiments can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in communications.

ACRONYMS LIST

ASIC Application-specific integrated circuit
DMS Device management system
FPGA Field-programmable gate array
GSM Global system for mobile communication
IC Integrated Circuit
IoT Internet of Things
LTE Long term evolution
M2M Machine to machine
NB-IoT Narrowband IoT
NFV Network function virtualization
PoS Proof-of-stake
PoW Proof-of-work
SDN Software defined network
SRC Short range communication
UI User interface
WCDMA Wideband code division multiple access
WLAN Wireless local area network

The invention claimed is:

1. An apparatus comprising at least one processor; and at least one memory including computer program code, the at least one memory and computer program code configured to, with the at least one processor, cause the apparatus to at least:
generate a smart contract with information of a number of targeted devices to perform an update,
provide the smart contract for a distributed ledger,
detect an indication to the distributed ledger on readiness to perform the update by the number of targeted devices, and
detect another indication to the distributed ledger on performance of the update by the number of targeted devices,
wherein the smart contract comprises timing information indicative of a time or time period at which to activate a radio for listening to smart contract updates.

2. The apparatus of claim 1, wherein detection of the indication to the distributed ledger is based on at least one transaction to the distributed ledger.

3. The apparatus of claim 1, wherein detection of the indication to the distributed ledger further causing performing the update by the number of targeted devices.

4. The apparatus of claim 1, wherein the apparatus is further caused to detect the indication about a readiness to perform the update and/or of a completeness of the performance of the update in a form of at least one signature to the smart contract stored in the distributed ledger.

5. The apparatus of claim 1, wherein the apparatus is further caused to remove the smart contract from the distributed ledger in response to receiving the indication of the performance of the update by the number of targeted devices.

6. The apparatus of claim 1, wherein the apparatus is further caused to include in the smart contract at least one of:
an address of the update package,
information about a threshold number of devices that need to be ready to perform the update,
information of time limit upon which the entire transaction must be completed, or
identifiers of the number of targeted devices that need to perform the update.

7. The apparatus of claim 1, wherein the smart contract comprises timing information indicative at least one of:
time by or at which the update needs to be carried out,
time by or at which the update is to be fetched,
time by or at which the update is cancelled if not performed before that time, or
time (or time period) at which to check if the number of targeted devices have indicated the readiness to perform the update.

8. An apparatus comprising at least one processor; and at least one memory including computer program code, the at least one memory and computer program code configured to, with the at least one processor, cause the apparatus to at least:
receive a smart contract in a distributed ledger with information of a number of targeted devices to perform an update;
verify that the smart contract is signed by a trusted party;
receive the update from an update provider;
send an indication of readiness to perform the update for the distributed ledger;
detect an indication to the distributed ledger about readiness to perform the update by the number of targeted devices; and
perform the update in response to the detected indication,
wherein the smart contract comprises timing information indicative of a time or time period at which to activate a radio for listening to smart contract updates.

9. The apparatus of claim 8, wherein the apparatus is further caused to send an indication by a transaction to the distributed ledger.

10. The apparatus of claim 8, wherein the apparatus is further configured caused to perform at least one of:
send an indication that the update has been received to the update provider, and
send, after performing the update, an indication for the smart contract in the distributed ledger that the update has been performed.

11. The apparatus of claim 8, wherein detection of an indication about a readiness to perform the update by the number of targeted devices comprises:
checking if a threshold number of devices have indicated in the smart contract that they are ready to perform the update, wherein the threshold number of devices is indicated in the smart contract, and
in response to detecting that the threshold number of devices have indicated in the smart contract that they are ready to perform the update, causing performing of the update.

12. The apparatus of claim 8, wherein the smart contract comprises instructions causing the number of targeted devices to carry out at least one of fetch the update or perform the update.

13. The apparatus of claim 8, wherein the smart contract further comprises timing information indicative at least one of time by or at which the update needs to be carried out, time by or at which the update is to be fetched, or time at which to check if the number of targeted devices have indicated the readiness to perform the update.

14. The apparatus of claim 8, wherein the update is a software update to a user or internet of things device, a configuration update to a user or internet of things device, or a configuration update to a physical or virtual network entity.

15. A method comprising:
generating a smart contract with information of a number of targeted devices to perform an update,
providing the smart contract for a distributed ledger,
detecting an indication to the distributed ledger on readiness to perform the update by the number of targeted devices, and
detecting another indication to the distributed ledger on performance of the update by the number of targeted devices,
wherein the smart contract comprises timing information indicative of a time or time period at which to activate a radio for listening to smart contract updates.

16. A method as claimed in claim 15 comprising:
detecting the indication to the distributed ledger is based on at least one transaction to the distributed ledger.

17. A method as claimed in claim 15 comprising:
detecting the indication to the distributed ledger causing performing the update by the number of targeted devices.

18. A method comprising:
receiving a smart contract in a distributed ledger with information of a number of targeted devices to perform an update;
verifying that the smart contract is signed by a trusted party;
receiving the update from an update provider;
sending an indication of readiness to perform the update for the distributed ledger;
detecting an indication to the distributed ledger about a readiness to perform the update by the number of targeted devices; and
performing the update in response to the detected indication,
wherein the smart contract comprises timing information indicative of a time or time period at which to activate a radio for listening to smart contract updates.

19. The method of claim 18, further comprising sending an indication by a transaction to the distributed ledger.

* * * * *

UNITED STATES PATENT AND TRADEMARK OFFICE
CERTIFICATE OF CORRECTION

PATENT NO. : 11,231,920 B2
APPLICATION NO. : 17/041526
DATED : January 25, 2022
INVENTOR(S) : Taivalsaari et al.

Page 1 of 1

It is certified that error appears in the above-identified patent and that said Letters Patent is hereby corrected as shown below:

In the Claims

<u>Column 19,</u>
Line 33, "configured caused to perform" should read --caused to--.

Signed and Sealed this
Twentieth Day of December, 2022

Katherine Kelly Vidal
*Director of the United States Patent and Trademark Office*